United States Patent [19]

Roever

[11] Patent Number: 4,689,777
[45] Date of Patent: Aug. 25, 1987

[54] FILLED HYDROPHONE MOUNTS

[75] Inventor: William L. Roever, Houston, Tex.

[73] Assignee: Shell Oil Company, Houston, Tex.

[21] Appl. No.: 256,176

[22] Filed: Apr. 21, 1981

[51] Int. Cl.$^4$ .............................................. G01V 1/38
[52] U.S. Cl. .................................... 367/153; 367/165
[58] Field of Search ................. 367/6, 16, 19, 20, 140, 367/141, 152–155, 157, 188, 152

[56] References Cited

U.S. PATENT DOCUMENTS

| 3,286,227 | 11/1966 | Aldrich | 340/13 |
| 3,353,150 | 11/1967 | Jacox | 367/155 |
| 3,696,329 | 10/1972 | Hazelhurst | 367/154 |
| 3,739,326 | 6/1973 | Kerr et al. | 340/7 R |
| 3,781,778 | 12/1973 | Sawin et al. | 340/7 R |
| 3,860,899 | 1/1975 | Watlington | 367/130 |
| 3,893,065 | 7/1975 | Lea et al. | 367/152 |
| 3,961,304 | 6/1976 | Bakewell | 340/7 R |
| 4,090,168 | 5/1978 | Miller et al. | 340/3 T |
| 4,300,218 | 11/1981 | Kruka et al. | 367/20 |

Primary Examiner—Thomas H. Tarcza
Assistant Examiner—Ian J. Lobo

[57] ABSTRACT

A hydrophone mount for use with a marine streamer cable having solid foam flotation. The mount comprises a semicylindrical housing having a cavity formed on its outer surface for receiving the hydrophone. The hydrophone is mounted in the recess and the voids filled with an acoustic responsive material. The mount is positioned in a semicylindrical recess formed in the stream cable coaxially with the center of the cable. The stress member and electrical conductors are located at the center of the streamer cable.

4 Claims, 4 Drawing Figures

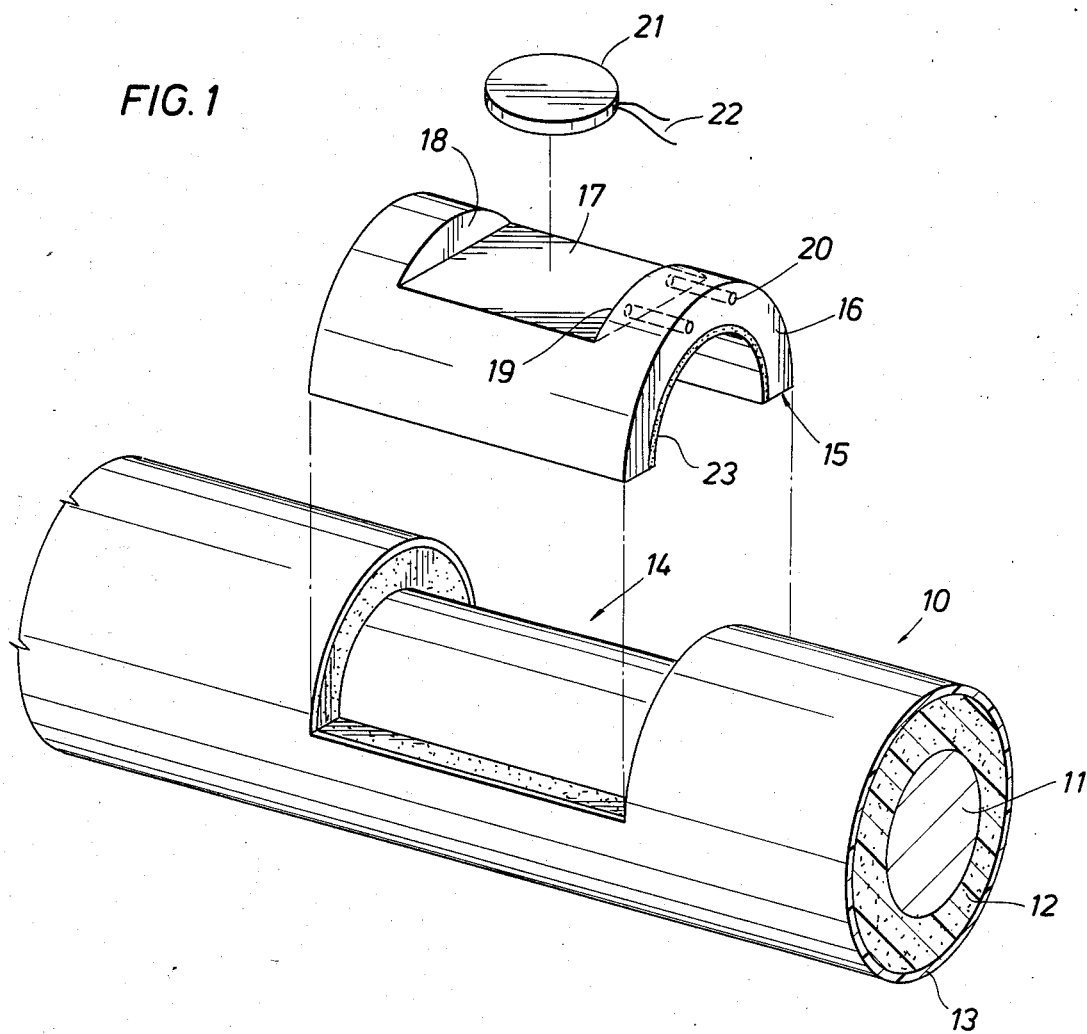
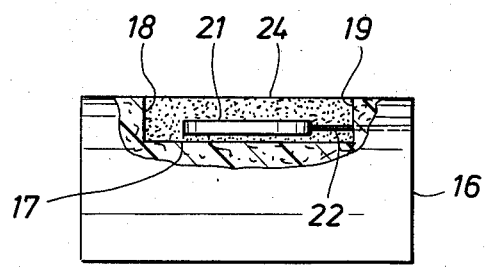
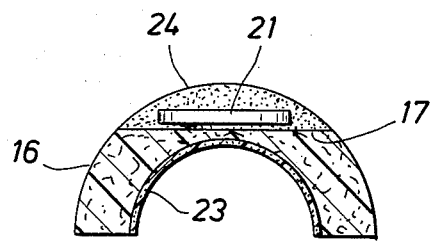
FIG. 1
FIG. 2

FILLED HYDROPHONE MOUNTS

BACKGROUND OF THE INVENTION

This invention relates generally to marine seismic cables and more particularly to a mounting for placing seismic transducers at discrete locations along the seismic cable.

In marine seismic exploration, the seismic cable is towed in a submerged fashion behind a vessel, and seismic detectors in the cable receive reflections of acoustic wave energy to map the geologic strata beneath the surface of the earth. The acoustic wave energy is produced by devices well known to those skilled in the art and produces the reflections received at the transducer locations. Transducers are electrically connected to various recording apparatus onboard the vessel, wherein recording and/or processing of the collected seismic data may take place.

In the past, a number of seismic cables have been available for use in this type of seismic exploration. For instance, one streamer cable comprises a longitudinal tubular member which contains a plurality of spaced hydrophone transducers, with a number of wires interconnecting the hydrophones disposed within the tubular member. The tubular member may be filled with a liquid, such as oil or kerosene, to provide proper buoyancy.

However, one drawback with the use of such liquid-filled cables has been their susceptibility to damage. This occurs because the tubular member must necessarily have thin walls to allow for the transmission of acoustic wave energy. If this thin wall should rupture, kerosene leaks, the buoyance of the cable is lost and the hydrophones contained within the tubular member may be damaged or destroyed. In addition to this disadvantage, the transducers mounted within the hollow tubular member must be insulated from the effects of the oil or kerosene filling the cable and, of course, from any water which may find its way into the cable due to leakage. The hydrophones are easily susceptible to damage or breakage during deployment or handling of the streamer cable.

Another drawback with such liquid filled cables is their large size and weight. In order to maintain neutral buoyancy, a large volume of liquid is required since the buoyance is controlled by the difference in specific gravity between the liquid inside the cable and the water in which the cable is towed. Foam as herein described has a much greater buoyancy and therefore results in a smaller, lighter cable.

Another cable which has solved some of the above problems has been a seismic cable of solid construction which utilizes a solid to provide buoyancy as opposed to a liquid. Typically, a stress member is provided to allow towing of the solid seismic streamer cable. This stress member may be a single steel cable, or may be a synthetic with sufficient tensile strength to support the seismic cable. The electrical conductors needed to interconnect the hydrophones or transducers with each other and with the shipboard electronics may be located within the stress member or may surround the stress member in some fashion. Various types of hydrophones have been utilized with the solid cable construction, two of which will now be described.

One type of hydrophone which has been used with the solid cable construction is a piezoelectric ceramic of cylindrical construction which is mounted concentrically around the central core of the streamer cable, such as that described in U.S. Pat. No. 3,739,326, issued to Kerr et al. An air gap is provided beneath the cylinder to allow the piezoelectric element to respond to impinging seismic energy. This type of hydrophone suffers loss of sensivitity when water leaks into the air gap, which may occur when the cable is submerged and subsequently damaged. Another type of hydrophone for use in a cable of solid construction is described in U.S. Pat. No. 3,781,778 issued to Sawin et al. A disc-type hydrophone is mounted within a rigid case, which case is mounted on an eccentrically placed cable core of the seismic streamer cable. A gel is used to couple an outer covering of the case to the hydrophone so that acoustic wave energy is received by the hydrophone and transmitted to the shipboard electronics. The case construction is such that the entire structure conforms to the profile of the seismic cable. A polyurethane jacket is extruded over the case after it has been placed in a cavity of the hydrophone cable to provide a relatively smooth outer surface. However, this type of hydrophone mounting has been found susceptible to loss of response from puncture of the cable adjacent the rigid mountings and the resultant entry of sea water, or more frequently, creation of vapor pockets in the cavity due to diffusion. In addition, hydrophone repair is made difficult because of the jacket which has been extruded over the hydrophones.

Both of the above hydrophone mounts are fairly sensitive to cable-borne noise. Cable stress member perturbations such as longitudinal, lateral, or torsional waves which are picked up by hydrophones are referred to as cable-borne noise. For instance, sealed cavities are very sensitive to mount deformations induced by stress member perturbations. The deformation is increased where the stress member is mounted to one side of the cable. The nonsymmetrical construction produces larger and nonuniform deformations than a symmetrical cable.

SUMMARY OF THE INVENTION

The present invention solves the above problems by providing a hydrophone mount which is disposed concentrically with the foam-filled cable.

This permits the positioning of the stress members and the conductors at the center of the cable with the hydrophone mount surrounding the assembly. The hydrophone mount comprises the semicylindrical housing which has a recess formed on its outer surface. A ceramic disc-type hydrophone is disposed in the recess with the voids between the hydrophone and the recess being filled with a material which has acoustic characteristics that closely match the marine environment. Suitable materials are a moldable plastic, such as polysulfide rubber, or a liquid such as kerosene. The hydrophone mounting is designed so that its outer diameter is substantially the same as the outer diameter of the foam surrounding the central stress members and conductors. This permits the extrusion of an outer protective covering over the hydrophone streamer thus maintaining a smooth outer surface.

BRIEF DESCRIPTION OF THE DRAWING

The present invention will be more easily understood from the following detailed description when taken in conjunction with the attached drawings in which:

FIG. 1 is an exploded isometric view of a hydrophone mount constructed according to this invention.

FIG. 2 shows an elevation and vertical cross-section of the hydrophone mount of FIG. 1.

FIG. 5 is a vertical section of the cable showing an alternative embodiment which utilizes two hydrophones mounts.

FIG. 6 is a vertical section of the cable showing an alternative embodiment which utilizes two hydrophone mounts.

DESCRIPTION OF A PREFERRED EMBODIMENT

Figure 3:
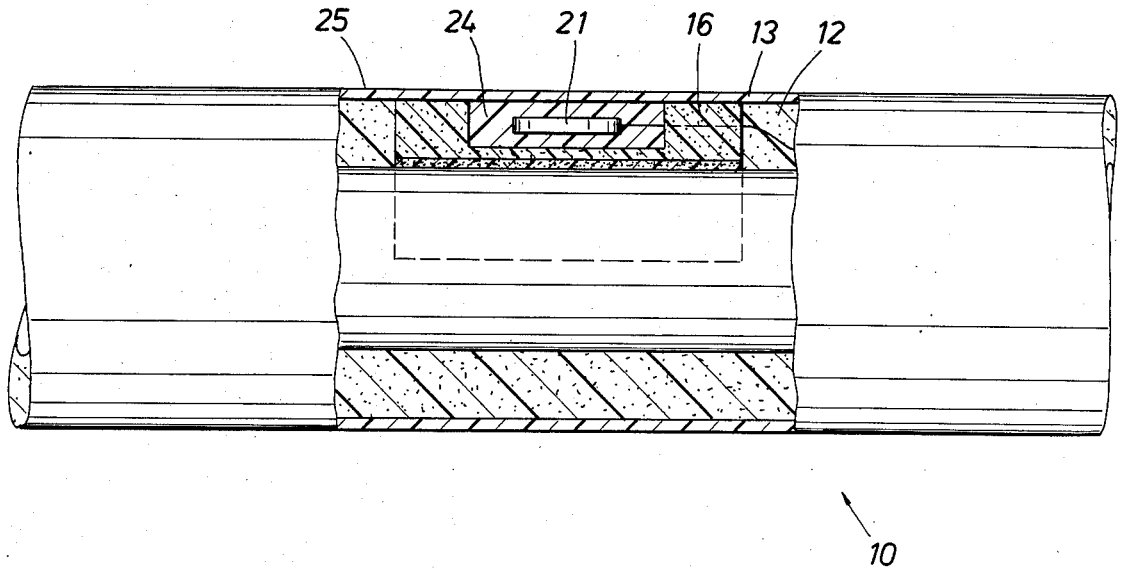
FIG. 3 is a vertical section of the cable showing the hydrophone mount of FIG. 1.

Referring now to FIG. 1, there is shown a marine cable 10 having a central section 11 surrounded by a semirigid foam 12 area. In order to protect the cable, the outer surface of the cable is covered with an extruded plastic sheath 13 formed of a suitable plastic, for example, polyurethane plastic. Central section 11 of the cable contains the stress member and the electrical conductors necessary for transmitting the hydrophone signals to the recording system located on the exploration vessel. The stress member may be either a flexible steel cable or a synthetic fiber rope.

The hydrophone mount is designed to fit into a semicircular recess 14 formed on the outer surface of the cable. The recess 14 is formed by removing the buoyancy foam from the cable. Normally, the central section 11 containing the stress members and electrical conductors will have a smooth plastic outer covering and thus the foam may be readily removed to form the recess 14. The hydrophone mount 15 comprises a semicylindrical housing 16 which has a recess 17 formed on its outer surface. The recess 17 has a flat bottomed surface which is in effect a cord of the semicircle having parallel vertical end walls 18 and 19. Tubular openings 20 are provided in the housing 16 for electrical leads 22 of the ceramic hydrophone 21. The ceramic hydrophone 21 has a substantially flat shape which can be readily positioned within the recess 17. A thin foam layer 23 is positioned on the inner surface of the mount 16 to provide some insulation from the central section 11 of the marine cable.

In FIG. 2, there is shown an elevation view and a vertical section of the hydrophone mount of FIG. 1 with the hydrophone mounted therein. In particular, the hydrophone 21 is disposed in the recess 17 which is then filled with a solid material 24 having acoustic properties similar to those of the marine environment. A suitable material would be polysulfide rubber. As shown, the hydrophone 21 is elevated from the bottom of the recess 17 or, in effect, suspended within the material 24 used for filling the voids in the recess 17. The housing 16 of the mount 15 is preferably formed of a material which is acoustically inert and does not add noise or ghosts to the hydrophone signal. A suitable material would be rigid polyurethane with embedded hollow glass spheres.

Referring now to FIG. 3, there is shown an elevation view of the hydrophone mount shown in FIGS. 1 and 2. In this view, the outer plastic covering 25 of the marine cable is shown extruded over the top of the hydrophone mount. As explained above, this covering is preferably a molded plastic which can be continuously extruded over the outer surface of the buoyancy foam 12 and the hydrophone mounts. The covering provides mechanical protection for the foam and serves to exclude water from the marine cable.

Figure 4:
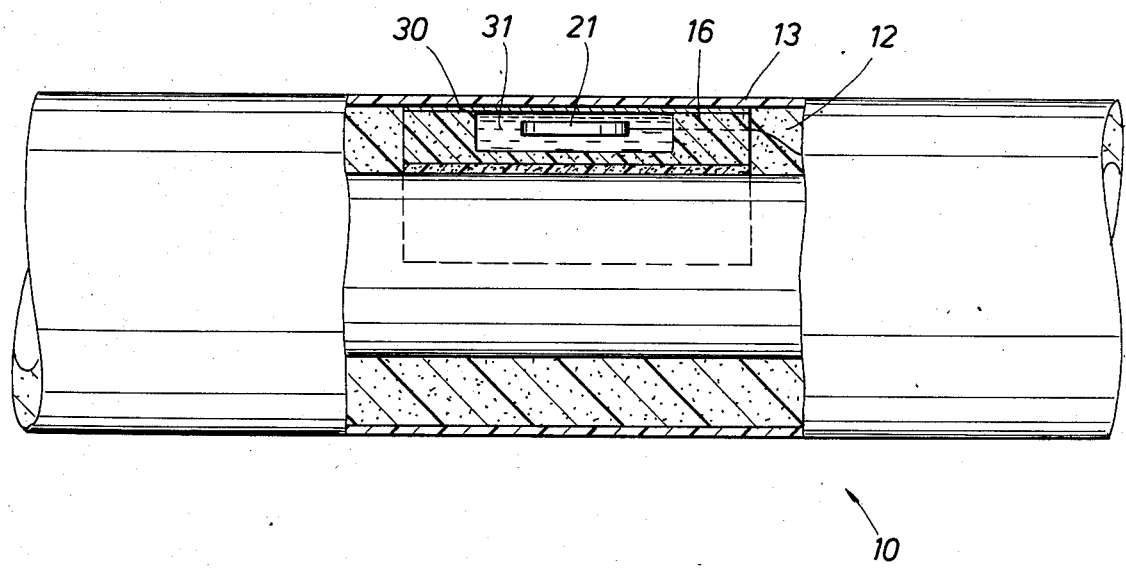
FIG. 4 is a vertical section of the cable showing a modified hydrophone mount.

Referring to FIG. 4, there is shown a modified hydrophone mount in which the voids in the recess are filled with a fluid having similar acoustic characteristics to the marine environment. In addition, the fluid should be an insulating, or non-conducting fluid. Suitable fluids would be kerosene or other hydrocarbons. The liquid 31 fills the voids in the recess of the mount and is retained or sealed within the recess by means of an outer cover 30 which is cemented or sealed to the outer surface of the housing 16. The cover 30 may be sealed to the mount 16 by the use of suitable sealants such as polysulfide rubber. In addition, grooves or other recesses may be formed in the outer surface of the mount 16 to provide a sealing ring around the recess.

The above described mounts may be modified by utilizing a second semicircular mount which is positioned diametrically opposite the housing. This would permit clamping the two semicircular mounts around the central section of the cable by suitable fastening means, not shown. The clamping of the mount reduces the noise caused by movement between the mount and the cable.

In a preferred embodiment each semicircular mount contains a hydrophone element, as illustrated in FIGS. 5 and 6. These two elements on opposite sides of the streamer cable are connected in parallel resulting in a cancellation of outputs resulting from transverse accelerations of the cable.

What is claimed is:

1. A marine seismic cable, comprising:
    a central stress member and conductor assembly;
    a flotation body surrounding said central stress member and conductor assembly, wherein said flotation body has a first and second recess formed in the outer surface thereof, said second recess being located opposite said first recess;
    a first semicylindrical housing having a first cavity in the outer surface thereof, said first housing being shaped and positioned in said first recess such that the outer surface of said first housing substantially conforms with the outer surface of said flotation body;
    a moldable material positioned in said first cavity, said moldable material being shaped so that the outer surface thereof substantially conforms with the outer surface of said first housing;
    a hydrophone suspended in said moldable material;
    a jacket positioned around and in contact with said flotation body, first housing and outside surface of said moldable material;
    a second semicylindrical housing having a second cavity in the outer surface thereof, said second housing being shaped and positioned in said second recess such that the outer surface of said second housing substantially conforms with the outer surface of said flotation body;
    a moldable material positioned in said second cavity in said second housing, said moldable material in said second cavity in said second housing being shaped so that the outer surface thereof substantially conforms with the outer surface of said second housing; and a second hydrophone suspended in said moldable material in said second cavity in said second housing, said first housing and said second housing substantially surrounding said central stress member and conductor assembly and said jacket being positioned around and in contact with said second housing and the outside surface of said moldable material in said second cavity in said second housing.

2. A marine seismic cable as recited in claim 1, wherein said hydrophone and said second hydrophone are electrically connected in parallel.

3. A marine seismic cable, comprising:

a central stress member and conductor assembly;

a flotation body surrounding said central stress member and conductor assembly, wherein said flotation body has a first and second recess formed in the outer surface thereof, said second recess being located opposite said first recess;

a first semicylindrical housing having a first cavity in the outer surface thereof, said first housing being shaped and positioned in said first recess such that the outer surface of said first housing substantially conforms with the outer surface of said flotation body;

a liquid positioned in said first cavity;

a hydrophone suspended in said liquid such that said hydrophone is free-floating;

a first cover positioned adjacent said first housing such that said first cover prevents said liquid from escaping such cavity, and a second semicylindrical housing having a second cavity in the outer surface thereof, said second housing being shaped and positioned in said second recess such that the outer surface of said second housing substantially conforms with the outer surface of said flotation body;

a liquid positioned in said second cavity in said second housing;

a second hydrophone suspended in said liquid in said second cavity in said second housing such that said second hydrophone is free-floating; and a second cover positioned adjacent said second housing such that said second cover prevents said liquid from escaping from said second cavity in said second housing, and wherein said first housing and said second housing substantially surrounding said central stress member and conductor assembly.

4. A marine seismic cable as recited in claim 3, wherein said hydrophone and said second hydrophone are electrically connected in parallel.

* * * * *